United States Patent [19]

Morishita et al.

[11] Patent Number: 4,947,949
[45] Date of Patent: Aug. 14, 1990

[54] MOTOR-DRIVEN TYPE POWER ASSISTED STEERING CONTROL APPARATUS

[75] Inventors: Mitsuharu Morishita; Kosaku Uota; Takeshi Yasukawa, all of Himeji, Japan

[73] Assignee: Mitsubishi Denki Kabushiki Kaisha, Tokyo, Japan

[21] Appl. No.: 343,310

[22] Filed: Apr. 26, 1989

[30] Foreign Application Priority Data

May 13, 1988 [JP] Japan .................................. 63-117388

[51] Int. Cl.⁵ ............................................. B62D 5/04
[52] U.S. Cl. ...................... 180/79.1; 180/142; 364/424.05
[58] Field of Search ................ 180/79.1, 142; 364/424.05

[56] References Cited

U.S. PATENT DOCUMENTS

| | | | |
|---|---|---|---|
| 4,300,650 | 11/1981 | Weber | 180/142 |
| 4,518,055 | 5/1985 | Yogi et al. | 180/142 |
| 4,573,545 | 3/1986 | Kains | 180/79.1 |
| 4,621,327 | 11/1986 | Dolph et al. | 364/424.05 |
| 4,685,528 | 8/1987 | Suzuki et al. | 364/424.05 X |
| 4,715,463 | 12/1987 | Shimizu | 180/79.1 |
| 4,736,810 | 4/1988 | Morishita et al. | 180/79.1 |
| 4,809,173 | 2/1989 | Fukami et al. | 364/424.05 |
| 4,837,690 | 6/1989 | Morishita et al. | 180/142 X |

FOREIGN PATENT DOCUMENTS 0077696 4/1983 European Pat. Off. .
0249902 12/1987 European Pat. Off. .
205556 11/1986 Japan .

OTHER PUBLICATIONS

European Search Report 89107561.6 dated Aug. 16, 1989.

*Primary Examiner*—Charles A. Marmor
*Assistant Examiner*—Mitchell Bompey
*Attorney, Agent, or Firm*—Sughrue, Mion, Zinn, Macpeak and Seas

[57] ABSTRACT

A motor-driven power assisted steering control apparatus includes a steering torque sensor 1, a motor 14 connected to a steering shaft via a clutch to exert an auxiliary steering force, and circuitry for controlling the motor in correspondence to an output from the steering torque sensing means. A torque neutral point detector 23 detects the neutral point of the steering torques, and first and second level detecting circuits 27, 29 detect when the motor current exceeds first and higher second levels, respectively. When the motor current exceeds the first level with the steering torque value at other than the neutral point, the clutch current is reduced to cause slippage, and when the motor current exceeds the second level with the steering torque value at other than the neutral point, the clutch current is interrupted to thereby stop the motor.

3 Claims, 3 Drawing Sheets

4,947,949

MOTOR-DRIVEN TYPE POWER ASSISTED STEERING CONTROL APPARATUS

BACKGROUND OF THE INVENTION

The present invention relates to a motor-driven type power assisted steering control device for an automobile. More particularly, it relates to such apparatus of a type that operations of a steering wheel are assisted by a motor on the basis of signals of a steering torque sensor.

A conventional motor-driven type power assisted steering control apparatus is so constructed that a torque sensor detects a torque of steering; an output from the torque sensor is supplied to a control means so that an auxiliary torque in proportion to the output of the torque sensor is generated by means of a motor, and the auxiliary torque is given to a steering shaft to thereby assist a power for operating the steering wheel.

FIG. 2 is a diagram of a control circuit for a conventional motor-driven power assisted steering control apparatus wherein a reference numeral 1 designates a torque sensor, a numeral 16 a motor control circuit, numerals 15A, 15B input terminals and a numeral 2 an interface circuit for a steering torque detection signal, through which the steering torque detection signal is supplied to a microcomputer 3 (hereinbelow, referred to as CPU). A numeral 4 designates an interface circuit for supplying a signal to turn a motor in the right direction, through which a signal for driving the motor in the right direction is input from the CPU 3 to a motor driving circuit 10. A numeral 5 designates an interface circuit for supplying a signal to turn the motor in the left direction, through which a signal for driving the motor in the left direction is inputted from the CPU 3 to the motor driving circuit 10. Numerals 13A, 13B respectively designate output terminals through which terminals of the motor 14 are connected. A numeral 6 designates a D/A conversion circuit. An error amplifier for controlling the motor 14 has an input terminal which receives a torque detection signal from the CPU 3, which is inputted as an analog signal after having been subjected to D/A conversion, and another input terminal which receives an output from a detection circuit 11 for detecting a motor current. A numeral 9 designates a pulse width modulation signal oscillator which produces a signal for pulse width modulation (PWM) control, and the output of the oscillator 9 is inputted to a PWM modulator 8 along with an output from the error amplifier 7. The PWM modulator 8 supplies a PWM signal to the motor driving circuit 10. A numeral 12 designates a resistor for detecting a motor current.

FIG. 3 is a diagram showing the output characteristics of the torque sensor 1 wherein the abscissa represents a steering torque in the right or left direction and the ordinate represents a torque output. A symbol $T_0$ indicates a neutral point of steering torques (the zero point of torque). The right region of $T_0$ represents a steering torque for a steering wheel turned in the right direction and the left region represents a steering torque for the steering wheel turned in the left direction. A symbol $T_2$ represents a steering torque in which a control in the right direction is started and a symbol $T_1$ represents a steering torque in which a control in the left direction is started. Symbols $V_0$-$V_2$ respectively designate detection outputs corresponding to $T_0$-$T_2$. The output characteristics are substantially linear in a range of control. As a result, the region between $T_1$ and $T_2$ constitutes a non-sensitive zone of control.

FIG. 4 is a diagram showing the output characteristics of the motor 14 wherein the symbols $V_1$-$V_2$ are the same as defined above, $V_3$ designates a saturated torque detection output in the right direction and a symbol $V_4$ designates a saturated torque detection output in the left direction. The motor output changes in a substantially linear fashion between $V_2$ and $V_3$, and it changes in a substantially linear fashion between $V_1$ and $V_4$ so as to be symmetric therewith. The motor output becomes zero between $V_1$ and $V_2$, and the motor output exhibits a constant value $P_{max}$ in the region greater than $V_3$ or smaller then $V_4$.

The operation of the conventional device a shown in FIG. 2 will be described. When an operator handles a steering wheel, a torque detection signal in proportion to a steering torque of the steering wheel is outputted from the torque sensor 1, and the signal is inputted to the CPU 3 through the interface circuit 2. The CPU 3 outputs a torque detection signal as a digital signal. The torque detection signal is converted into an analog signal by means of the D/A conversion circuit 6. The direction or polarity of the torque detection signal is determined in the CPU 3. As a result, a driving signal for driving the motor in the right direction is supplied to the interface circuit 4 or a driving signal for driving the motor in the left direction is supplied to the interface circuit 5. The motor driving circuit 10 receives a driving signal from the interface circuit 4 or 5 to drive the steering wheel in the right or left direction; thus an instruction of turning direction of the motor 14 is provided.

The output of the D/A conversion circuit 6 is inputted to the error amplifier 7, and the output of the error amplifier 7 is inputted to the PWM modulator 8. The output of the PWM modulation oscillator 9 is inputted to the PWM modulator 8. As a result, a control signal having a pulse width in proportion to the torque detection signal is supplied from the PWM modulator 8 to the motor driving circuit 10 so that the torque of the motor 14 is controlled on the basis of the output of the motor driving circuit 10. A current flowing in the motor 14 is detected by the motor current detection circuit 11, whereby the motor current is limited or is interrupted depending on a detected level of the current.

However, when a locking phenomenon or the like takes place in the motor 14 in the conventional apparatus, the steering wheel can also become locked or become extremely heavy and difficult to handle, which causes a dangerous state.

SUMMARY OF THE INVENTION

It is an object of the present invention to provide a motor-driven power assisted steering control to prevent a steering wheel from falling in state of locking due to a state of locking in the motor to thereby assure safety.

In accordance with the present invention, there is provided a motor-driven power assisted steering control apparatus comprising a steering torque sensing means for detecting a torque of steering, a motor connected to a steering shaft via a clutch to thereby exert an auxiliary force for steering to the steering shaft and a control means for controlling the motor in correspondence to an output from the steering torque sensing means, the apparatus being characterized by comprising:

a torque neutral point detecting means for detecting the neutral point of steering torques, a first level detecting means for detecting that a motor current exceeds a first level, and a second level detecting means for detecting that the motor current exceeds a second level which is greater than the first level, wherein when the motor current exceeds the first level in a case that a steering torque value is at other than the neutral point, a current flowing in the clutch is reduced, and when the motor current exceeds the second level in a case that the steering torque value is at other than the neutral point, the current flowing in the clutch is interrupted to thereby stop the motor.

DETAILED DESCRIPTION OF THE PREFERRED EMBODIMENT

Preferred embodiment of the motor-driven power assisted steering control apparatus of the present invention will be described with reference to the drawings.

Figure 1:
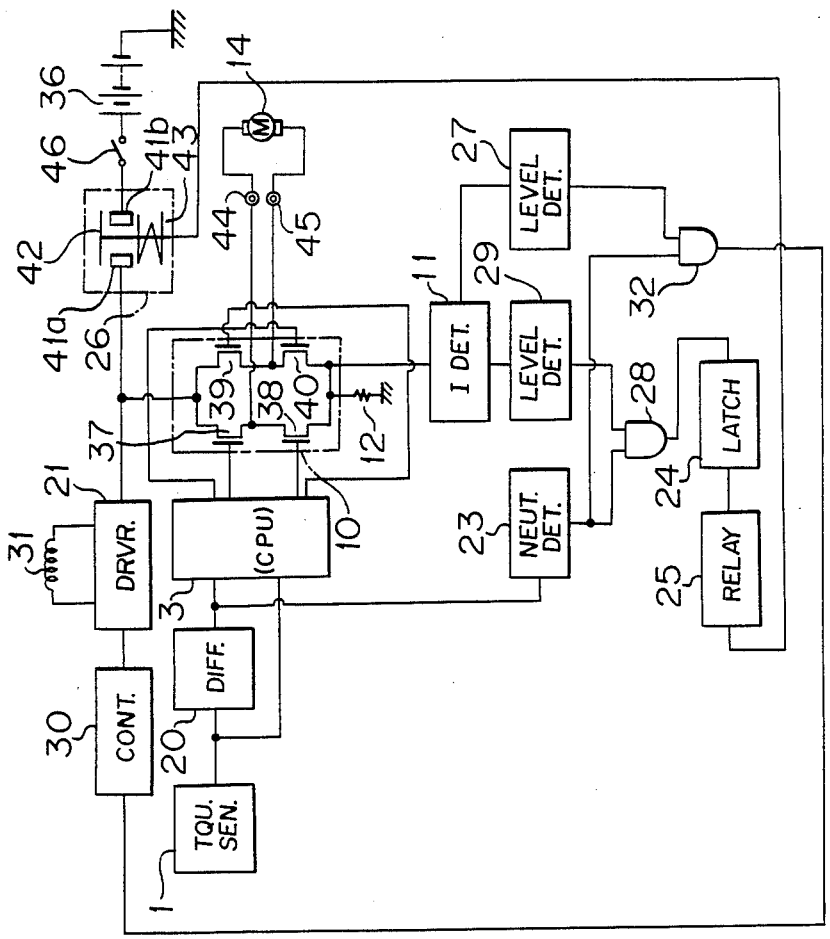
FIG. 1 is a block diagram of an embodiment of the control circuit for a motor-driven power assisted steering control apparatus according to the present invention.
Figure 2:
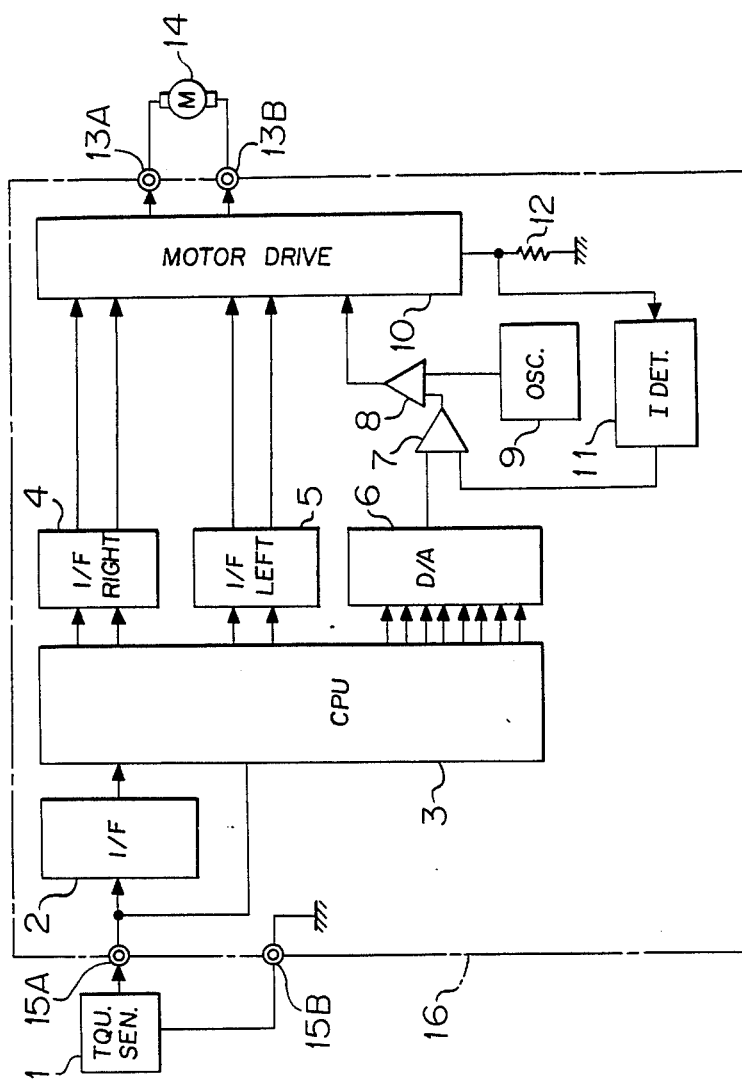
FIG. 2 is a block diagram of a conventional control circuit for a power assisted steering control apparatus.
Figure 3:
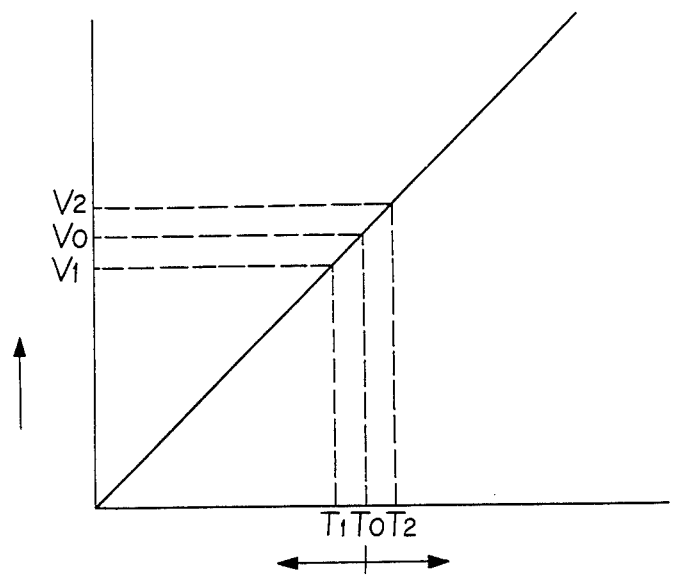
FIG. 3 is a diagram showing the output characteristics of a torque sensor.
Figure 4:
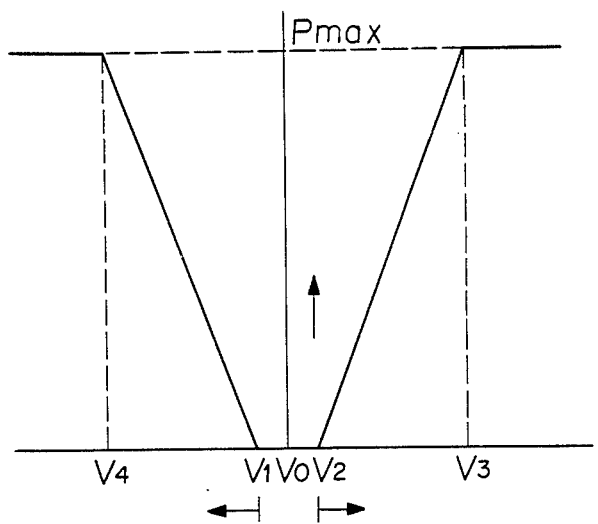
FIG. 4 is a diagram of the output characteristics of a motor.

FIG. 1 is a diagram showing a control circuit for the power assisted steering control apparatus of the present invention, wherein a reference numeral 20 designates a differentiation circuit, a numeral 21 designates a clutch driver for driving a clutch, a numeral 23 designates a torque neutral point detection circuit or latch for detecting a neutral point of torque, a numeral 24 designates a self-sustaining circuit, a numeral 25 designates a relay interrupting circuit, a numeral 26 designates a fail-safe relay which comprises stationary contacts 41a, 41b, a movable contact 42 and an exciting coil 43, a numeral 27 designates a first level determining device, numerals 28 and 32 designate AND circuits, a numeral 29 designates a second level determining device, a numeral 30 designates a clutch current control circuit, a numeral 31 designates a clutch coil, and a numeral 36 designates a power source. The motor driving circuit 10 is constituted by a bridge circuit comprising four power MOS FETs 37–40. Numerals 44, 45 designate output terminals and a numeral 46 designates a key switch.

The operation of the control apparatus of the present invention will be described.

On activating the key switch 46, the fail relay 26 is activated and the movable contact 42 comes to contact with stationary contacts 41a, 41b, whereby a current is fed to the motor driving circuit 10 and the clutch driver 21 so that the motor 14 is connected to the steering shaft by means of the clutch. A steering torque produced in the steering wheel is detected by the torque sensor 1, and the output of the torque sensor is inputted to the CPU 3 and the torque neutral point detecting circuit 23 through the differentiation circuit 20. The CPU 3 processes the torque detection signal to detect the direction and the magnitude of the torque produced in the steering wheel, and outputs a signal to the motor driving circuit 10. The motor driving circuit 10 controls the magnitude and the direction of a current flowing in the motor 14 through the output terminals 44, 45, so that the motor 14 is driven. The driving force of the motor 14 is supplied to the steering shaft via the clutch to thereby assist in the operation of the steering wheel.

The motor current detection circuit 11 detects the current flowing in the motor through the resistor 12. The torque neutral point detecting circuit 23 detects the neutral point of torque $T_0$, i.e. a neutral state of the steering wheel. The output of the torque neutral point detecting circuit 23 is inputted to the AND gate 28 along with the output of the second level determining device 29. The output of the AND gate 28 is supplied to the fail-safe relay 26 through the self-sustaining circuit 24 and the relay interrupting circuit 25. The output of the torque neutral point detecting circuit 23 is inputted to the AND gate 32 along with the output of the first level determining device 27. And the output of the AND gate 32 is supplied to the clutch current control circuit 30.

When the torque neutral point detecting circuit 23 detects the fact that the torque to the steering wheel is out of the neutral point region and when the current flowing in the motor 14 exceeds the first level, a control signal is supplied to the clutch current control circuit 30 to reduce the clutch coil current, whereby there occurs a slipage in the clutch. Accordingly, the motor 14 becomes locked or jammed or nearly locked, which would attendantly cause the motor current increase, the clutch coil current is reduced to thereby weaken the coupling or connection between the motor and the steering shaft, thus enabling the steering wheel to be more easily manually operated. Moreover, if the motor 14 becomes fully locked, which would further increase the motor current, the AND gate 28 is turned on to open the fail-safe relay 26, whereby the current supplied to the motor driving circuit 10 and the clutch driver 21 is interrupted. Accordingly, the steering wheel is brought to a state of complete manual operation.

As described above, in accordance with the present invention, when the motor lugs down or jams, or becomes nearly locked, the steering wheel is isolated from the clutch or the motor so that the steering wheel is brought into a state of manual operation or nearly manual operation. Accordingly, there is no possibility that the operator feels the operation of the steering wheel to be abnormally heavy, whereby an automobile can be safely driven.

We claim:

1. A motor-driven power assisted steering control apparatus including a steering torque sensing means (1) for detecting a steering torque, a motor (14) connected to a steering shaft via a clutch to exert an auxiliary steering force on the steering shaft, a control means for controlling said motor in correspondence to an output from said steering torque sensing means, said apparatus being characterized by:

a torque neutral point detecting means (23) for detecting a neutral point of steering torque, means (11) for sensing a current flowing in said motor, a first level detecting means (27) for detecting when said motor current exceeds a first level, and a second level detecting means (29) for detecting when said motor current exceeds a second level which is greater than the first level, means (32, 30, 21) responsive to the torque neutral point detecting means and the first level detecting means for reducing a current flowing in said clutch when the motor current exceeds the first level and the steering torque value is at other than the neutral point, and means (28, 24, 25, 26) responsive to the torque neutral point detecting means and the second level detecting means for interrupting the current flowing in said clutch and said motor when the motor current exceeds the second level and the steering torque value is at other than the neutral point.

2. The motor-driven power assisted steering control apparatus according to claim 1, wherein said first level detecting means and said torque neutral point detecting means are connected to a serial connection of a clutch current control circuit (30) and a clutch driving circuit (21) through an AND gate (32).

3. The motor-driven power assisted steering control apparatus according to claim 1, wherein said second level detecting means and said torque neutral point detecting means are connected to a serial connection of a self-sustaining circuit (24), a relay interrupting circuit (25) and a fail-safe relay (26) through an AND gate (28).

* * * * *